Oct. 17, 1967  C. C. QUARLES  3,347,022
PROCESS FOR REMOVAL OF SOLID PARTICLES FROM A
HYDROGEN FLUORIDE REACTOR
Filed Jan. 29, 1965
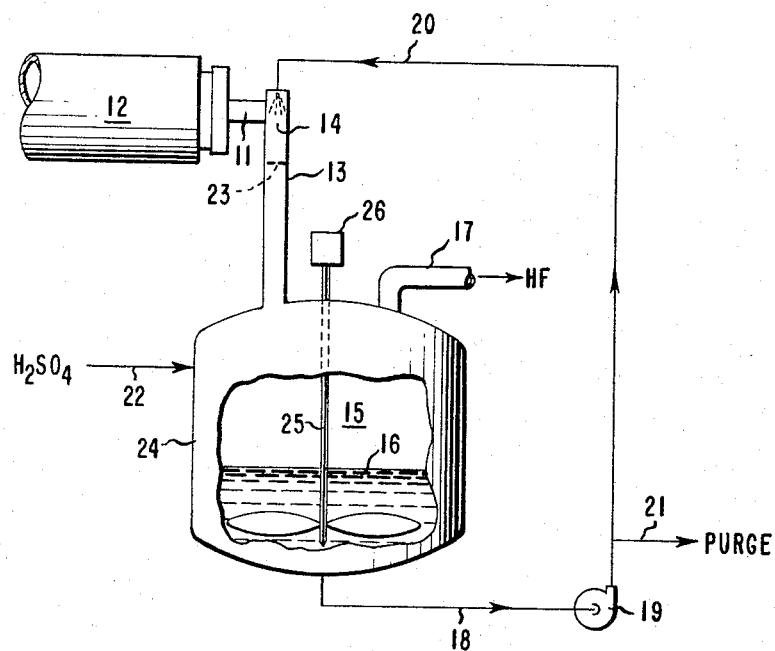
INVENTOR
CHARLES C. QUARLES
BY *Norbert F. Reinert*
ATTORNEY United States Patent Office 3,347,022
Patented Oct. 17, 1967

3,347,022
PROCESS FOR REMOVAL OF SOLID PARTICLES FROM A HYDROGEN FLUORIDE REACTOR
Charles C. Quarles, Baytown, Tex., assignor to E. I. du Pont de Nemours and Company, Wilmington, Del., a corporation of Delaware
Filed Jan. 29, 1965, Ser. No. 428,916
4 Claims. (Cl. 55—71)

This invention relates to the production of hydrogen fluoride. More particularly, this invention relates to a dust scrubbing process for the removal of solid particles from the effluent product gas stream of a hydrogen fluoride reactor.

It is well recognized in the art of hydrogen fluoride production wherein a metal fluoride is contacted with sulfuric acid in a reactor that the hydrogen fluoride bearing product gases removed from the reactor contain appreciable amounts of solid particles which must be removed before hydrogen fluoride is isolated from the gas stream as the final product of the process. One means of removing these solids from the product gas stream is by scrubbing with concentrated sulfuric acid. Such a scrubbing scheme also is effective in removing minor amounts of sulfuric acid vapor and water vapor which are carried over in the product stream from the hydrogen fluoride reactor.

When using calcium fluoride as the metal fluoride reactant, the dust removed from the product gas stream contains primarily $CaSO_4$ and $CaF_2$ solids in very fine particle size. The chief difficulty with this scrubbing process is that as the solids content in the sulfuric scrubber acid builds up, the solids exhibit a tendency to recrystallize or agglomerate into larger particles and to solidify. This results in a pluggage of the scrubber system, particularly at small openings as in spray nozzles from which the scrubber acid is sprayed for intimate contact with the product gas stream. If complete pluggage is not caused, this build up of coarse particles makes the sulfuric scrubber acid more difficult to handle than the same solids content maintained in its original fine particle state and thus requires that some scrubber acid be purged from the system to eliminate solids sooner than otherwise would be necessary.

It has been found in accordance with the present invention that significantly improved efficiency and economies can be obtained when the dust scrubbing operation is conducted under operating conditions wherein the temperature of the sulfuric scrubber acid and its composition is controlled within specified limits. More specifically, it has been found in accordance with the invention that dust removed from the hydrogen fluoride gas stream can be maintained in its original fine state so that the scrubber system can be kept free of pluggage and a larger amount of dust can be removed per unit of sulfuric scrubber acid purged from the system than previously possible if the scrubbing operation is carried out in a closed chamber within a temperature range of about 80° C. to 170° C. wherein its composition is controlled so that it is substantially saturated with hydrogen fluoride, the solids content does not exceed about 40% by weight and if the temperature is below 125° C., the water content of said acid is controlled so that the product of said scrubber acid temperature in degrees centigrade and percent water by weight in said scrubber acid exceeds about 600.

Preferably, the temperature of operation, or the temperature of the sulfuric scrubber acid, used in the system is between 130° C. and about 150° C. Furthermore, it is preferable for purposes of the present invention that the composition of this acid be controlled so that its water content is 4.5 to 10% by weight and the solids content does not exceed about 30% by weight.

The term "sulfuric scrubber acid" used herein means the acid stream purged from a HF scrubbing operation which is predominately sulfuric acid on a solids-free basis. This sulfuric scrubber acid contains appreciable amounts of calcium sulfate solids, fluosulfonic acid, water, and hydrogen fluoride and in addition contains small amounts of various process derived contaminants or by-products such as silicon tetrafluoride and sulfur.

A better understanding of the method of the process of this invention will be gained from the following detailed description taken together with the accompanying patent drawing which schematically illustrates a scrubbing system in combination with a hydrogen fluoride reactor that is suitable for purposes of conducting the method of the invention.

Referring now to the drawing, there is provided a line 11 as a means for taking off a product gas stream bearing HF from a hydrogen fluoride reactor 12 of which only a fragment is represented. The reactor may be of any form suitable for the contacting of a metal fluoride with sulfuric acid liquid and/or vapor. Rotary kiln reactors are often used in large-scale production operated either in a counter-current or co-current flow scheme. Alternatively, the hydrogen fluoride reactor can be a pug mill, moving bed reactor or a fluidized bed reactor. Various suitable hydrogen fluoride reactors are illustrated and their operation discussed in USP 3,102,787.

The hydrogen fluoride product gas stream passes via line 11 to dust scrubber 13 wherein it is intimately contacted with scrubber acid that is emitted as a spray from spray 14 positioned within dust scrubber 13 and above the level thereon where line 11 enters dust scrubber 13. The efficiency of the scrubbing operation may be increased by including an orifice 23 between the gas inlet and the gas liquid separator tank 24.

The sulfuric scrubber acid removes dust and other contaminants present in the product gas stream while falling by gravity down through scrubber 13 to separator tank 24, collecting in layer 16 of sulfuric scrubber acid maintained at the bottom thereof. The scrubber product gas stream forms above layer 16 in gas liquid disengaging zone 15 and is taken off continuously via line 17 to a recovery train for further purification. Sulfuric scrubber acid is withdrawn from separator tank 24 by means of line 18 and by means of pump 19 and line 20 transported to spray 14.

Layer 16 of sulfuric scrubber acid is maintained at a temperature within the range of about 80° C. to 170° C. by heating or cooling means not shown. Preferably, layer 16 is kept agitated such as with stirrer 25 driven by motor 26. Layer 16 is sampled frequently in order to determine water content, HF content, and solids content. When the solids content exceeds about 30 to 35% by weight, some sulfuric scrubber acid is purged from the system by means of line 21. Make-up sulfuric acid is added to the system by means of line 22 which enters separator tank 24. The water content of the sulfuric scrubber acid may be maintained within the specified limits required for the method of this invention by varying the concentration of the make-up acid added through line 22 or by controls imposed upon the reactor 12 which will vary the water content of the HF product gas entering the scrubber through line 11. The sulfuric scrubber acid is maintained substantially saturated with HF at all times by the high partial pressure of HF above layer 16 in gas liquid disengaging zone 15.

The invention will be further explained by the following example which illustrates the best mode contemplated for carrying out the scrubbing method of the invention.

Water content of the sulfuric scrubber acid is determined in the examples and elsewhere herein by titration with Karl Fischer reagent to the potentrometric dead stop end point. The titer is calculated as water content by weight on a solids-free basis. The solids content of the sulfuric scrubber acid is determined by evaporating a weighed sample of sulfuric scrubber acid to dryness and then igniting at 600 to 700° C. The residue after ignition is weighed and calculated by percent solids by weight.

*Example*

Utilizing the apparatus shown in the attached drawing, a hydrogen fluoride product gas stream from reactor 12 is introduced via line 11 to dust scrubber 13 at a temperature of 170° C. and a rate of 110 pounds per hour. Sulfuric scrubber acid is sprayed through the product gas stream from spray 14 at a rate of 1250 pounds per hour. The sulfuric scrubber acid, bearing dust and contaminants removed from the product gas stream falls downwardly through scrubber 13 and collects in layer 16 held in separator tank 24. The gas volume flow per minute is about 14 times the volume of the disengaging zone 15 of separator tank 24. The scrubbed product gases enriched in HF content also passes through scrubber 13 and is present in the gas liquid disengaging zone 15. The product gas stream is drawn off continuously at a rate of 75 pounds per hour and transported to a recovery train for the further purification of HF. Sulfuric scrubber acid is removed from layer 16 via line 18 at 1340 pounds per hour to pump 19. Of the 1340 pounds per hour discharged from pump 19, 90 pounds per hour of sulfuric scrubber acid containing about 30% by weight calcium sulfate is purged via line 21 from the system and the remaining 1250 pounds per hour is carried to spray 14 via line 20 and discharged into scrubber 13. The sulfuric acid is maintained between 130 and 140° C., essentially saturated with HF and at a solids concentration of about 30%. The gas pressure in the scrubber system is approximately one atmosphere absolute.

Under these conditions of operation conforming to the principles of the invention, there were no difficulties in line or spray pluggage and inspection of samples of the scrubber acid slurry confirmed that there was no appreciable increase in the size of dust particles removed from the HF product stream.

Since many different embodiments of the invention may be made without departing from the spirit and scope thereof, it is to be understood that the invention is not limited by the specific illustrations hereinabove set forth except to the extent defined in the following claims.

I claim:

1. In a process comprising bringing a calcium sulfate-containing product gas stream taken from a hydrogen fluoride reactor into intimate contact with a sulfuric scrubber acid within a closed chamber, removing said product gas stream from said closed chamber after being contacted with said scrubber acid and recycling said scrubber acid until a substantial amount of calcium sulfate solids accumulates therein, the improvement comprising maintaining said scrubber acid at a temperature within the range of from 80 to 170° C., with the proviso that when said temperature is below 125° C. the water content of said scrubber acid is controlled such that a product of greater than 600 is obtained when said temperature in degrees centigrade is multiplied by the water content in weight percent, and maintaining the calcium sulfate solids content of said scrubber acid such that it does not exceed about 40% by weight.

2. The process of claim 1 wherein said temperature is maintained within the range of from 130 to 150° C.

3. The process of claim 2 wherein said water content is within the range of from 4.5 to 10% by weight and said solids content does not exceed about 30% by weight.

4. In a process wherein substantial amounts of calcium sulfate solids accumulate in sulfuric acid containing hydrogen fluoride and the resulting slurry is to be handled as a fluid, the improvement comprising maintaining said slurry at a temperature within the range of from 80 to 170° C., with the proviso that when said temperature is below about 125° C. the water content of said slurry is maintained such that a product of greater than 600 is obtained when said temperature in degrees centigrade is multiplied by said water content in weight per cent, and maintaining the calcium sulfate solids content of said slurry such that it does not exceed about 40% by weight.

References Cited

UNITED STATES PATENTS

| | | | |
|---|---|---|---|
| 2,507,605 | 5/1950 | Lopker et al. | 23—153 |
| 2,521,367 | 9/1950 | Hegan | 23—121 |
| 2,952,334 | 9/1960 | Provoost et al. | 55—71 X |

REUBEN FRIEDMAN, *Primary Examiner.*

J. W. ADEE, *Assistant Examiner.*